Patented May 12, 1936

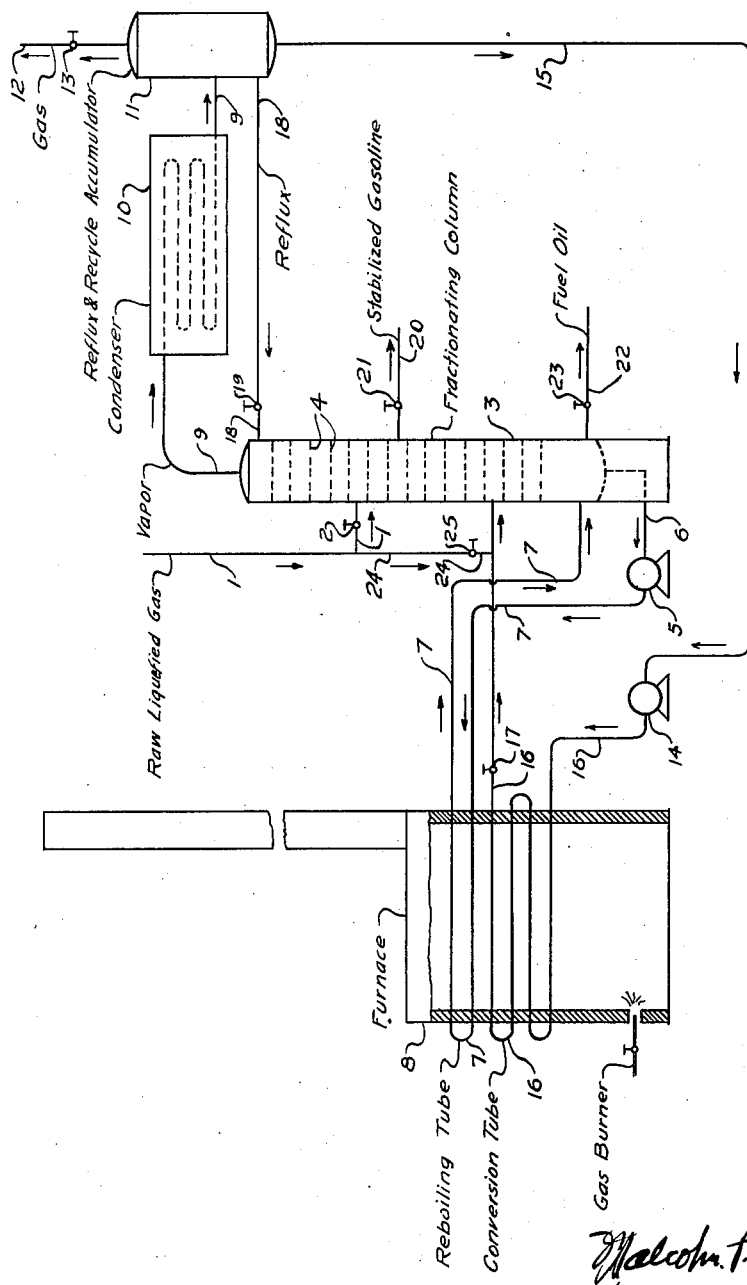

2,040,455

UNITED STATES PATENT OFFICE 2,040,455

COMBINED STABILIZING AND GAS CONVERSION PROCESS

Malcolm P. Youker, Bartlesville, Okla., assignor to Phillips Petroleum Company, Bartlesville, Okla., a corporation of Delaware Application May 10, 1932, Serial No. 610,513

17 Claims. (Cl. 196—10)

This invention relates to the manufacture of stable motor fuel from very volatile hydrocarbon liquids and gases such as are contained in natural gas and in the gases which result from the cracking of oils. An object of the invention is to provide a process by which a mixture of hydrocarbon materials, a portion of which is sufficiently stable to be incorporated in motor fuel, and a portion of which is too volatile to be incorporated in motor fuel, may be treated to first separate from this mixture the less volatile portion and subsequently reform a part of the more volatile portion of the mixture. Other objects of the invention will be made apparent in the following discussion.

My new process may be understood from the description given below which refers to the accompanying drawing on which a form of apparatus, by which my process may be carried out, is illustrated in side elevation.

Referring to the drawing, raw liquefied gas is delivered through a pipe 1 in which is mounted a valve 2 into a fractionating column 3 at a point intermediate between some of bubble trays 4 in fractionating column 3. A portion of the hydrocarbon liquid which arrives at the bottom of the fractionating column 3 is withdrawn therefrom by a pump 5 through a pipe 6 and is delivered by pump 5 through reboiling tube 7, which passes through a furnace 8 and delivers into the bottom of fractionating column 3. The furnace 8 is fired and the material passing through reboiling tube 7 is heated to the extent that a portion of this material enters the bottom of the fractionating column 3 in the vapor phase and flows thence upward through the bubble trays 4 and the fractionating column 3. Vapors which arrive at the top of the fractionating column 3 flow thence through a pipe 9, which passes through a condenser 10 and delivers into an accumulator 11. A portion of the vapors which pass through pipe 9 and condenser 10 are condensed therein and as a result a mixture of liquid and gases flows from the pipe 9 into the accumulator 11. Gas accumulated in the accumulator 11 is delivered therefrom through a pipe 12 in which is mounted a back pressure valve 13. A portion of the liquid which accumulates in the accumulator 11 is withdrawn therefrom by a pump 14 through a pipe 15 and is delivered by pump 14 through a conversion tube 16 which passes through furnace 8 and delivers into fractionating column 3 at a point below the point of entry of pipe 1 into fractionating column 3 and intermediate between some of the bubble plates 4. A back pressure valve 17 is mounted in conversion tube 16 at a point between the furnace 8 and fractionating column 3 and is utilized to maintain regulated high pressure on the materials passing through that portion of the conversion tube which lies between this valve 17 and the pump 14. The materials passing through the conversion tubes 16 are heated to a temperature such that a considerable portion of these materials are converted to comparatively less volatile materials in passage through conversion tube 16. The temperature at which materials are heated in passage through conversion tube 16 will ordinarily lie between 750 degrees F. and 950 degrees F., however, these temperatures will vary with the character of material undergoing conversion and with the pressure maintained in the tube 16. While conversion of these materials may be obtained in the conversion tube 16 under almost any pressure I find it desirable to manipulate the valve 17 to maintain a pressure in the tube 16 between the valve 17 and the pump 14 of upwards of 500 pounds per square inch. The heated converted materials existing from conversion tube 16 into fractionating column 3 are largely in the vapor phase upon entry in fractionating column 3 and this vaporous material will flow upward through bubble plates 4 and fractionating column 3. A portion of the liquid which accumulates in the accumulator 11 will be delivered therefrom through a pipe 18 in which is maintained a valve 19 into the top of fractionating column 3 and will flow thence downward over bubble plates 4 and will contact thereon and condense a portion of the vapors which rise through fractionating column 3 and the condensate thus produced will flow downward through fractionating column 3 over bubble plates 4. A portion of the condensate which will flow downward over bubble plates 4 will be withdrawn from the fractionating column 3 through a pipe 20 in which is mounted a valve 21 and which is connected into fractionating column 3 at a point intermediate between the points of entry of the conversion tube 16 and the pipe 1 into fractionating column 3. Liquids which accumulate in the bottom of the fractionating column 3 will be withdrawn therefrom by a pipe 22 in which is mounted a valve 23. The quantity of refluxed liquid delivered through pipe 18 into the top of fractionating column 3 will be so regulated as to condense within the fractionating column 3 that portion of the vapors which rise through the fractionating column 3 which have a vapor pressure sufficiently low to satisfy the requirements for the liquids obtained from the process. Increasing the quantity of liquid refluxed will increase the vapor pressure of the liquid obtained from the fractionating column 3 through the pipe 20 and vice versa. The gravity and end point of the liquid obtained from the fractionating column 3 through the pipe 20 will be regulated by regulating the quantity of liquid so obtained and increasing the quantity of liquid so obtained will raise the end point of such liquid and vice versa. A pressure of 400 or 500 pounds per square inch will preferably be maintained in the fractionating column 3 and the accumulator 11, and in inter-connecting pipe lines, however, either lower or higher pressures may be maintained in these parts of the equipment. A pipe 24 in which is maintained a valve 25 is interconnected between pipe 1 and conversion tube 16 and raw liquefied gas may, if desired, be delivered therefrom into the outlet of conversion tube 16. The materials withdrawn from the fractionating column 3 through the pipes 20 and 22 are passed therefrom through coolers to storage tanks, neither of which are shown.

Through the use of this process raw liquefied gas obtained from the conventional natural gasoline plant, or from the condenser of a cracking still, or from a conventional gasoline plant used to separate liquefied gas from the cracked gas emanating from cracking stills may be delivered into the fractionating column 3 and therein separated into two fractions, one of which is already sufficiently stable to be incorporated in motor fuel, and one of which is too volatile to be incorporated in motor fuel. The less volatile fraction will be obtained from the process through the pipe 20, while the more volatile fraction will accumulate in the accumulator 11 and will be delivered thence through the conversion tube 16 and will be partially reformed in the conversion tube 16 as to volatility in such a way that this reformed material will be sufficiently stable to form a part of motor fuel and may be separated out and recovered from the fractionating column 3 through the pipe 20. The reforming operation carried out in the conversion tube 17 is of such a character that some fuel oil and gas oil is in some instances produced. This material is separated out into fractionating column 3 and recovered therefrom through the pipe 22.

While I have described in detail one method of carrying out my new process I do not wish to be limited to these particular details but intend to claim all the advantages which are inherent in my new process.

I claim:

1. In a process of the character described, introducing an original charge consisting of a mixture of very volatile hydrocarbon liquids and gases into a rectifying zone, rectifying said mixture in said zone and thereby separating a first fraction which is sufficiently stable to be incorporated in motor fuel from a second fraction which is too volatile to be incorporated in motor fuel, passing a portion of the second fraction from the rectification zone through a conversion zone and back into said rectification zone, subjecting the last mentioned portion in the conversion zone to conditions of polymerization and thereby reforming some of said portion, and discharging a part of the reformed portion with said first fraction from the rectification zone.

2. In a process of the character described, introducing an original charge consisting of a mixture of very volatile hydrocarbon liquids and gases into a rectifying zone, rectifying said mixture in said zone and thereby separating a first fraction which is sufficiently stable to be incorporated in motor fuel from a second fraction which is too volatile to be incorporated in motor fuel, passing a portion of the second fraction from the rectification zone through a conversion zone and back into said rectification zone, subjecting the last mentioned portion in the conversion zone to conditions of polymerization and thereby reforming some of said portion, discharging a part of the reformed portion with said first fraction from the rectification zone, and passing heavy hydrocarbon liquid from the lower portion of the rectification zone through a heating zone and back into the rectification zone for reboiling purposes.

3. In a process of the character described, admixing an original charge consisting of raw very volatile hydrocarbon liquids and gases with converted hydrocarbons while the latter are in heated condition resulting from conversion, introducing said mixture into a rectifying zone, rectifying the mixture in said zone and thereby separating a fraction which is sufficiently stable to be incorporated in motor fuel from a second fraction which is too volatile to be incorporated in motor fuel, returning a portion of the second fraction to the zone of conversion for reprocessing, and discharging said first fraction from the zone of rectification.

4. In a process of the character described, introducing an original charge consisting of a raw mixture of very volatile hydrocarbon liquids and gases into a rectification zone, rectifying said mixture in said zone and thereby separating a fraction which is sufficiently stable to be incorporated in motor fuel from a second fraction which is too volatile to be incorporated in motor fuel, withdrawing a portion of the second fraction from said zone and subjecting the same to suitable conversion conditions of time, temperature and pressure and then reintroducing the same into said rectification zone, and withdrawing stabilized gasoline from said zone.

5. In a process of the character described, introducing an original charge consisting of a raw mixture of very volatile hydrocarbon liquids and gases into a rectification zone, rectifying said mixture in said zone and thereby separating a fraction which is sufficiently stable to be incorporated in motor fuel from a second fraction which is too volatile to be incorporated in motor fuel, withdrawing a portion of the second fraction from said zone and subjecting the same to suitable conversion conditions of time, temperature and pressure and then reintroducing the same into said rectification zone, and withdrawing stabilized gasoline from said zone, said rectification zone being maintained under superatmospheric pressure.

6. In a process of the character described, introducing a stream of raw very volatile hydrocarbon liquids and gases into a rectification zone at one elevation, introducing a stream of hot reformed hydrocarbon liquid into said zone at a lower elevation, maintaining said zone under superatmospheric pressure, discharging from the upper portion of said zone at a point above said first mentioned elevation, a vaporous fraction of hydrocarbon material which is too volatile to be incorporated in motor fuel, subjecting said vaporous fraction to cooling and condensation, and returning a portion of the condensate into the upper portion of the rectifying zone as a reflux, passing the remaining portion of said condensate through a conversion zone and thereby forming said stream of hot reformed hydrocarbon liquid, and discharging stabilized gasoline from the rectification zone at an elevation between said first and second mentioned elevations.

7. In a process of the character described, introducing a stream of raw very volatile hydrocarbon liquids and gases into a rectification zone at one elevation, introducing a stream of hot reformed hydrocarbon liquid into said zone at a lower elevation, maintaining said zone under superatmospheric pressure, discharging from the upper portion of said zone at a point above said first mentioned elevation, a vaporous fraction of hydrocarbon material which is too volatile to be incorporated in motor fuel, subjecting said vaporous fraction to cooling and condensation, and returning a portion of the condensate into the upper portion of the rectifying zone as a reflux, passing the remaining portion of said condensate through a conversion zone and thereby forming said stream of hot reformed hydrocarbon liquid, discharging stabilized gasoline from the rectification zone at an elevation between said first and second mentioned elevations, and discharging fuel oil from the rectification zone at a point below said second mentioned elevation.

8. An apparatus of the class described, comprising a pressure rectification column, a valved pipe for introducing raw hydrocarbon fluid into the upper portion of said column, a reflux condenser, an accumulator, a pipe leading from the top of the column through the condenser into said accumulator, a gas vent pipe leading out of said accumulator and provided with a pressure control valve, a pipe connecting said accumulator to the upper portion of the column for feeding reflux from the accumulator to said column, a furnace, a heating coil in the furnace, a pipe connecting the accumulator to the inlet of said coil, a pipe connecting the outlet of the coil to said column, a pipe leading from the medial portion of the column for discharging stabilized gasoline from the same, and a valve interposed in the last mentioned pipe.

9. An apparatus of the class described, comprising a pressure rectification column, a valved pipe for introducing raw hydrocarbon fluid into the upper portion of said column, a reflux condenser, an accumulator, a pipe leading from the top of the column through the condenser into said accumulator, a gas vent pipe leading out of said accumulator and provided with a pressure control valve, a pipe connecting said accumulator to the upper portion of the column for feeding reflux from the accumulator to said column, a furnace, a heating coil in the furnace, a pipe connecting the accumulator to the inlet of said coil, a pipe connecting the outlet of the coil to said column, a pipe leading from the medial portion of the column for discharging stabilized gasoline from the same, a valve interposed in the last mentioned pipe, and a reboiling tube leading from the bottom of the column through the furnace and back to the lower portion of the column.

10. A process for stabilizing and converting a charging stock consisting of a mixture of raw very volatile hydrocarbon liquids and gases, comprising introducing said mixture into a fractionating zone and separating said mixture into a more volatile fraction and a less volatile fraction in said fractionating zone, withdrawing from said zone the said less volatile fraction without subjecting that fraction to conversion conditions, reforming and thus decreasing the volatility of a portion of the said more volatile fraction by subjecting the same to conversion conditions of high temperature and high pressure in a conversion zone, passing the reformed material from the conversion zone into the said fractionating zone, and withdrawing from said fractionating zone the reformed materials.

11. In a process of the character described, introducing an original charge consisting of a mixture of very volatile hydrocarbon liquids and gases into a rectifying zone, rectifying said mixture in said zone and thereby separating a first fraction which is sufficiently stable to be incorporated in motor fuel from a second fraction which is too volatile to be incorporated in motor fuel, passing a portion of the second fraction from the rectification zone through a conversion zone and back into said rectification zone, subjecting the last mentioned portion in the conversion zone to conditions of polymerization and thereby reforming some of said portion, admixing said reformed portion with the mixture of very volatile hydrocarbon liquids and gases before the latter enters the rectifying zone, and discharging a part of the reformed portion with said first fraction from the rectification zone.

12. In a process of the character described, introducing an original charge consisting of a stream of raw very volatile hydrocarbon liquids and gases into a rectification zone at one elevation, introducing a stream of hot reformed hydrocarbon liquid into said zone at a lower elevation, maintaining said zone under superatmospheric pressure, discharging from the upper portion of said zone at a point above said first mentioned elevation, a vaporous fraction of hydrocarbon material which is too volatile to be incorporated in motor fuel, subjecting said vaporous fraction to cooling and condensation, and returning a portion of the condensate into the upper portion of the rectifying zone as a reflux, passing the remaining portion of said condensate through a conversion zone and thereby forming said stream of hot reformed hydrocarbon liquid, and discharging stabilized gasoline from the rectification zone at an elevation between said first and second mentioned elevations.

13. In a process of the character described, introducing an original charge consisting of a stream of raw very volatile hydrocarbon liquids and gases into a rectification zone at one elevation, introducing a stream of hot reformed hydrocarbon liquid into said zone at a lower elevation, maintaining said zone under superatmospheric pressure, discharging from the upper portion of said zone at a point above said first mentioned elevation, a vaporous fraction of hydrocarbon material which is too volatile to be incorporated in motor fuel, subjecting said vaporous fraction to cooling and condensation, and returning a portion of the condensate into the upper portion of the rectifying zone as a reflux, passing the remaining portion of said condensate through a conversion zone and thereby forming said stream of hot reformed hydrocarbon liquid, discharging stabilized gasoline from the rectification zone at an elevation between said first and second mentioned elevations, and discharging fuel oil from the rectification zone at a point below said second mentioned elevation.

14. A process for simultaneously stabilizing and converting a mixture of very volatile hydrocarbon gases and liquids which comprises first separating the said mixture into stabilized and unstabilized portions, then subjecting a part of the said unstabilized portion to conversion conditions, returning the resulting converted material to the said mixture, fractionating said material into additional stabilized and unstabilized portions simultaneously with the said mixture, and withdrawing the said stabilized portions together as a product of the process.

15. A process for simultaneously stabilizing and converting a mixture of very volatile hydrocarbon gases and liquids which comprises introducing the said mixture into a fractionating zone, separating said mixture into stabilized and unstabilized portions therein, subjecting a part of the unstabilized portion to conversion conditions in a conversion zone, returning the resulting converted material to the said fractionating zone, separating the said material into additional stabilized and unstabilized portions simultaneously with said mixture, and withdrawing from the said fractionating zone the said stabilized portions together as a final product of the process.

16. A process for manufacturing motor fuel from natural gasoline which comprises continuously heating normally gaseous hydrocarbon material under super-atmospheric pressure to a temperature such that a portion of said normally gaseous material will be converted into normally liquid hydrocarbon material, mixing natural gasoline which contains both normally gaseous hydrocarbons and normally liquid fractions of motor fuel with said heated converted material, thereby vaporizing said natural gasoline, separating said mixture into several fractions, thus separating constituents of motor fuel from said mixture.

17. A process for manufacturing motor fuel from natural gasoline which comprises continuously heating normally gaseous hydrocarbon material under super-atmospheric pressure to a temperature such that a portion of said normally gaseous material will be converted into normally liquid hydrocarbon material, mixing natural gasoline which contains both normally gaseous hydrocarbons and normally liquid fractions of motor fuel with said heated converted materials, thereby vaporizing said natural gasoline, separating said mixture into several fractions, thus separating constituents of motor fuel from said mixture, said normally gaseous material which is heated and converted being one of said fractions.

MALCOLM P. YOUKER.